United States Patent
Edi

(12) 
(10) Patent No.: US 6,527,643 B2
(45) Date of Patent: Mar. 4, 2003

(54) TELESCOPIC MECHANICAL TRANSMISSION WITH ANGULAR ADJUSTMENT FOR ASSEMBLY

(76) Inventor: Bondioli Edi, Via Gina Bianchi 18, 46029 Suzzara, Mantova (IT)

( * ) Notice: Subject to any disclaimer, the term of this patent is extended or adjusted under 35 U.S.C. 154(b) by 0 days.

(21) Appl. No.: 09/783,268

(22) Filed: Feb. 12, 2001

(65) Prior Publication Data

US 2001/0014624 A1 Aug. 16, 2001

(30) Foreign Application Priority Data

Feb. 15, 2000 (IT) ................................ FI2000A000030

(51) Int. Cl.⁷ ................................................. F16C 3/03
(52) U.S. Cl. ........................ 464/179; 464/160; 464/162
(58) Field of Search ................................ 464/179, 112, 464/113, 160, 162, 182, 172

(56) References Cited

U.S. PATENT DOCUMENTS

| | | | | |
|---|---|---|---|---|
| 1,965,742 A | * | 7/1934 | Junkers | 464/182 |
| 2,348,071 A | * | 5/1944 | Johnstone | 464/160 |
| 2,394,405 A | * | 2/1946 | Schjolin | 464/182 |
| 3,575,015 A | * | 4/1971 | Geisthoff | 464/23 |
| 3,884,049 A | * | 5/1975 | Pauli | 464/137 |
| 4,365,686 A | * | 12/1982 | Orain | 180/256 |
| 5,226,853 A | * | 7/1993 | Courgeon | 464/160 |
| 5,245,890 A | * | 9/1993 | Honlinger et al. | 464/162 |
| 5,657,545 A | * | 8/1997 | Haworth et al. | 464/23 |
| 5,762,556 A | * | 6/1998 | Kurian | 464/46 |
| 5,827,122 A | | 10/1998 | Kurian | |
| 5,938,534 A | | 8/1999 | Kurian et al. | |

* cited by examiner

*Primary Examiner*—Lynne H. Browne
*Assistant Examiner*—Kenn Thompson
(74) *Attorney, Agent, or Firm*—McGlew and Tuttle, P.C.

(57) ABSTRACT

In order to facilitate angular phase-alignment during assembly of a telescopic cardan shaft, comprising an outer splined shaft (1)—equipped with longitudinal inner splines (11)—and an inner splined shaft (3)—equipped with longitudinal outer projections (13, 13A)—the inner splines (11) of the outer shaft (1) have a width greater than the width of the outer projections (13,13A) of the inner splined shaft (3), in order to obtain a mutual angular play of at least 60°.

12 Claims, 3 Drawing Sheets

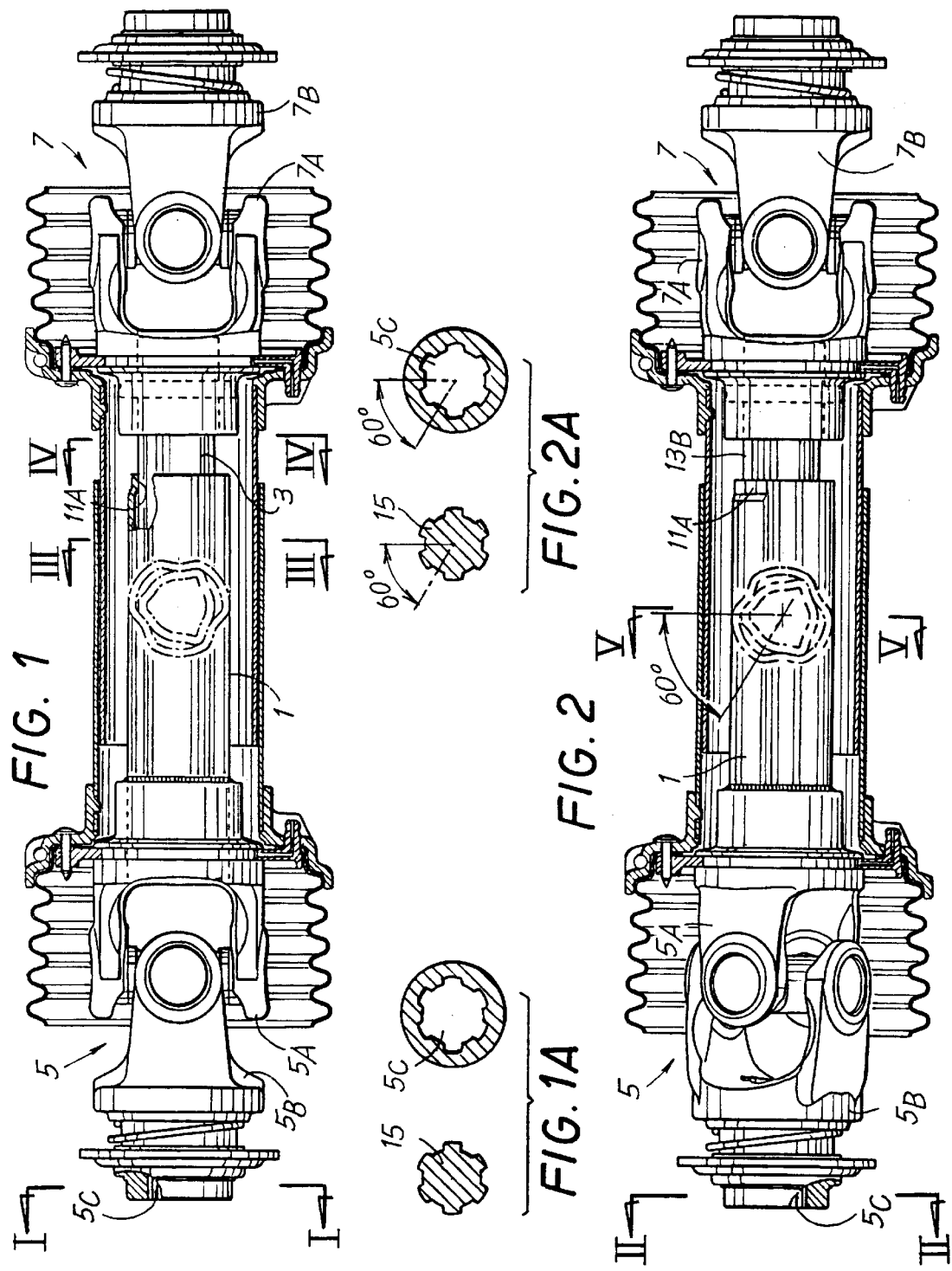

TELESCOPIC MECHANICAL TRANSMISSION WITH ANGULAR ADJUSTMENT FOR ASSEMBLY

BACKGROUND OF THE INVENTION

The invention relates to an extendable mechanical transmission of the type which are used in agriculture in many systems for transmission of the movement between an operating machine and a driving machine; this transmission generally comprises a pair of splined shafts which are capable of sliding axially with respect to each other in order to vary the length of the transmission and which are engaged with each other angularly for transmission of the rotational movement; these transmissions have, at the two ends, two cardan joints which are connected to each one of the two splined shafts and each of which comprises a pair of fork members articulated. perpendicularly with respect to each other.

Some difficulties arise during assembly of the splined-shaft transmission between each end cardan joint and the power takeoff which is provided in the adjacent mechanism; angular engagement is envisaged between a splined hub, generally of the power takeoff or the drive system, and a splined seat provided in the external fork member of each of the end cardan joints of the telescopic cardan shaft transmission. These difficulties are clarified more fully in the text which follows and are solved by the invention in question.

OBJECTS AND SUMMARY OF THE INVENTION

The invention therefore relates to a telescopic extendable mechanical transmission with two splined shafts axially slidable with respect to each other and in particular equipped with two end cardan joints with engaging systems for coupling to adjacent mechanisms; according to the invention, the splined profiles of the two shafts are shaped so as to provide mutual angular play.

In particular, the transmission comprises an outer splined shaft equipped with inner splines and an inner splined shaft equipped with outer projections;

in this case the inner splines of the outer shaft have a width greater than the width of the outer projections of the inner splined shaft, in order to obtain a mutual angular play of at least 60°, when six projections and six splines are envisaged.

The outer shaft may be tubular with a constant thickness and one of the splines may have a depression at the entry point, while a corresponding depression is provided along one of the longitudinal projections of the inner shaft. This results in an obligatory relative position of the two shafts.

BRIEF DESCRIPTION OF THE DRAWINGS

The invention will be understood more fully with reference to the description and the accompanying drawing which shows a practical non-limiting example of the invention itself. In the drawing:

FIG. 1 shows a partially sectioned transmission in the working condition with the fork members of the two cardan joints having the axes of articulation of the two cardan joints parallel to each other;

FIG. 1A shows a section along I—I in FIG. 1 with the two components separated;

FIGS. 2 and 2A are similar to FIGS. 1 and 1A, but show an assembly stage during which phase-alignment between the profiles of the end fork members and the power takeoff may have to be achieved;

DESCRIPTION OF PREFERRED EMBODIMENT

Figure 3:
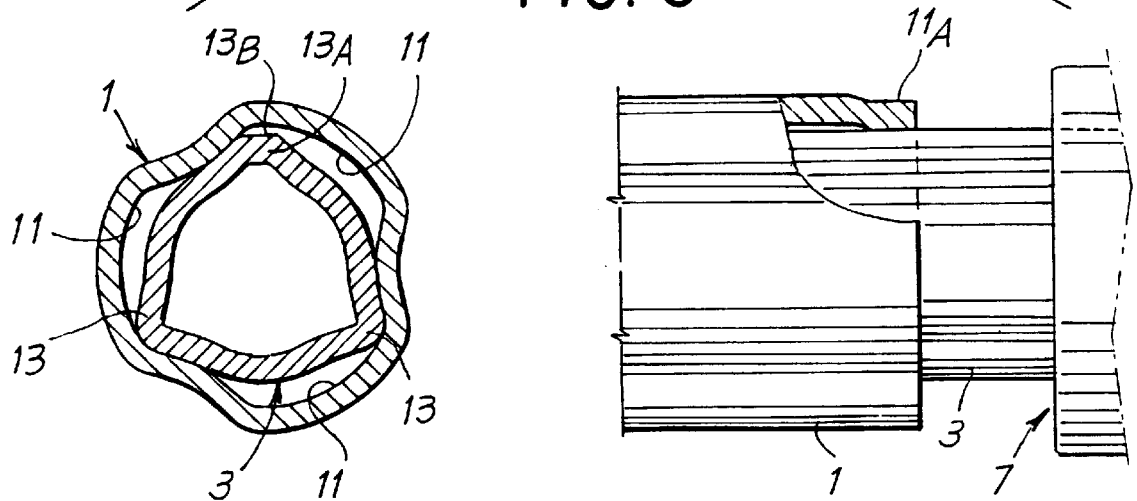
FIGS. 3 and 4 show an enlarged local section along III—III and IV—IV in FIG. 1.

FIGS. 1 and 2 show a conventional cardan shaft in which, however, the profiles of the two splined shafts which are slidable with respect to each other are modified according to the invention. These splined shafts are denoted by 1 in the case of the outer shaft and by 3 in the case of the inner shaft, which is tubular, whereby the inner shaft may also advantageously be tubular 5 and 7 denote generically the two end cardan joints which are associated with, respectively, the outer shaft 1 and the inner shaft 3; each of these cardan joints has a fork member 5A and 7A, respectively, which is integral with the shaft 1 and the shaft 3, respectively, and a fork member 5B and 7B, respectively, which is intended for a power takeoff of the mechanism adjacent to the corresponding fork member; in particular, in FIGS. 1 and 1A, 5C denotes the splined seat of the fork member 5B, while 15 denotes the splined male power takeoff which forms part of the mechanism to be coupled to the fork member 5. A similar arrangement exists for coupling of the cardan joint 7. Normally the splined engaging profiles, such as those 5C and 15, have a minimum of six splines or a greater number of splines. In FIGS. 1 and 2 the cardan shaft also has, as in the conventional manner, a protection around the shafts 1 and 3 and at least partially around the cardan joints 5 and 7.

In the working (i.e. transmission) condition, the fork members of the two cardan joints 5 and 7 have the perpendicular axes of articulation of one of the joints which are parallel to the corresponding axes of articulation of the other cardan joint. The engagements to be effected between the seat such as 5C and the male member such as 15 may be performed easily when the profiles 5C and 15 correspond, as shown in FIG. 1A.

Frequently, during the assembly stage, phase-alignment is required between the profiles, such as that 5C of the fork member 5B and/or such as that of the fork member 7B, and the corresponding profiles such as that 15 for the seat 5C and such as the corresponding profile for the seat of the fork member 7B. Sometimes angular adjustment of the power takeoffs adjacent to the splined shaft is not easy or possible and coupling is more complicated. The invention instead allows this coupling to be performed with extreme ease, as described below. Considering that which is illustrated in FIGS. 2 and 2A, if it is not possible to rotate the male member 15, coupling may be performed by imparting to the cardan joint 5 and to the outer shaft 1 a rotation so as to bring the splined profiles 15 and 5C into phase-alignment. When the splined profiles such as 15 and 5C have a number of splines greater than six, it is sufficient to be able to rotate the shaft 1 and the cardan joint 5 through an angle of less than 60°.

Sometimes it is not possible to obtain this possibility of angular play, if the other cardan joint, such as 7 in FIGS. 2 and 2A, is already engaged with the male member of the machine adjacent to said other joint and if this male member is not free to rotate.

In order to obtain with ease the required adjustment also in the above mentioned case, according to the invention, differentiation between the splines and the projections of the shaft 3 and the splines and the projections of the shaft 1 (compared to the normral geometry which envisages an exact geometric similarity between the cross sections of the two splined shafts such as 1 and 3) is envisaged.

Figure 4:
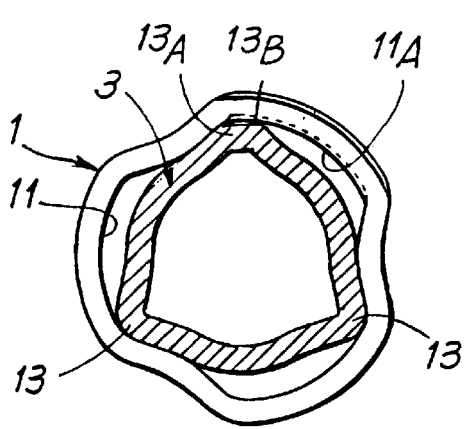
Figure 5:
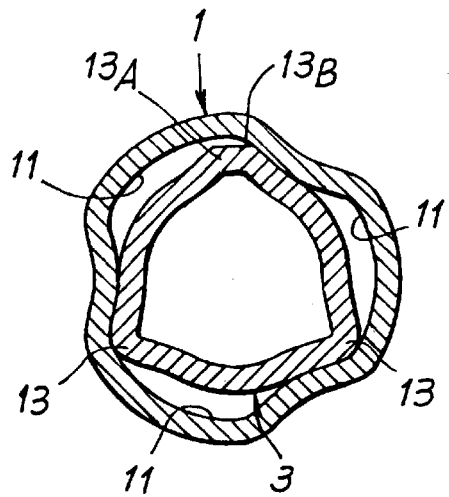
FIG. 5 shows an enlarged section along the line V—V in FIG. 2.

In particular, on the one hand the outer splined shaft 1 having the conventional form with three internal splines 11 distributed uniformly over the circumference and with a notable transverse width is envisaged, as can be seen in particular in FIGS. 3, 4 and 5. On the other hand the inner splined shaft 3 (which may also be tubular, but which may also be solid if necessary) has three external longitudinal projections 13, 13, 13A, each of which has a width much smaller than the width of the splines 11 of the outer shaft 1. As a result, a free angular play between the shaft 3 and the shaft 1 by an amount which can even be as much as at least 60° is possible, as can be clearly seen from the comparison between FIGS. 6C, 7C and 8C. As envisaged in conventional solutions, in order to ensure a positive engagement between the two telescopic splined shafts 1 and 3, a limited depression 11A of the inner spline 11 of the shaft 1 may be formed and a depression 13B of the longitudinal projection 13A with respect to the other two projections 13 of the inner splined shaft 3 is correspondingly provided; as a result the engagement between the two shafts 1 and 3 can occur only in the region of the depression 11A and the depression 13B as can be clearly seen in FIG. 4.

Figure 6A:
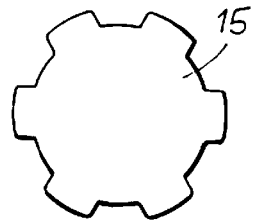
FIGS. 6A, 6B and 6C show, in a coordinated manner, the angular positions of the components which come into play in the cardan shaft in question, in conditions of exact phase-alignment for assembly and therefore the working condition.
Figure 6B:
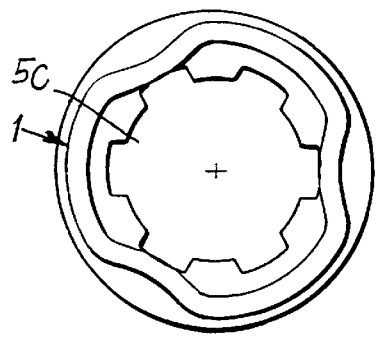
Figure 6C:
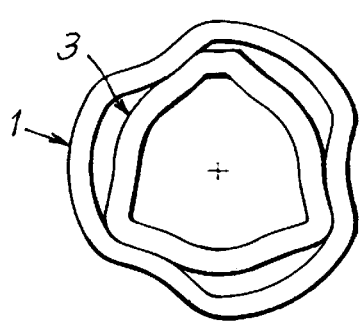
Figure 7A:
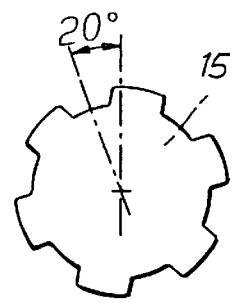
FIGS. 7A, 7B and 7C show, similarly to FIGS. 6A, 6B and 6C, an intermediate condition which requires angular phase-alignment between the two end cardan joints over an amplitude of the order of 20°.
Figure 7B:
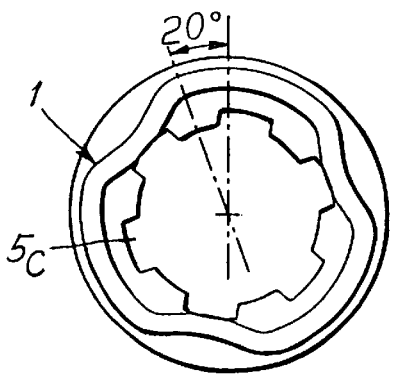
Figure 7C:
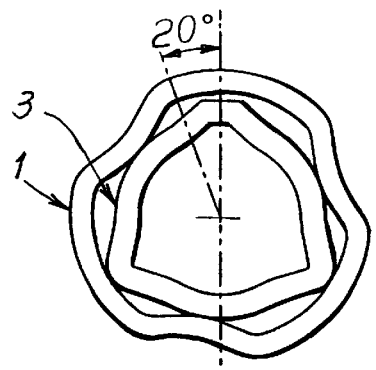
Figure 8A:
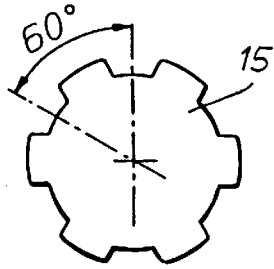
FIGS. 8A, 8B and 8C are similar to FIGS. 7A, 7B and 7C, but relate to a requirement for phase-alignment of the order of 60°.
Figure 8B:
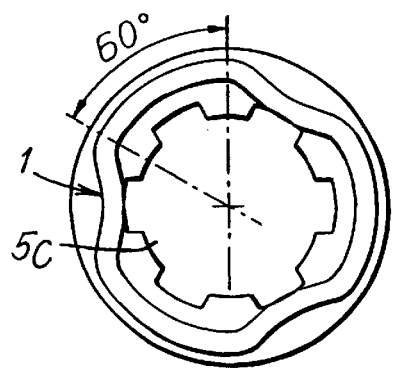
Figure 8C:
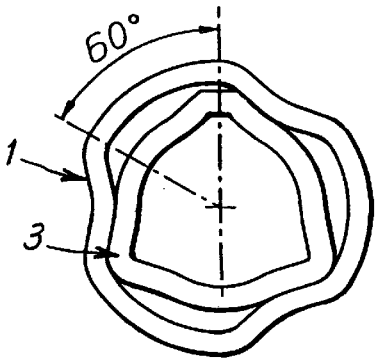

The functions of what has been described may be clearly understood by considering FIGS. 6A to 8C. The set of three figures, FIGS. 6A, 6B and 6C, illustrates schematically the conditions in which it is possible to achieve uniformity of engagement without angular adjustment during assembly of the cardan joint 5 with the power takeoff to be combined with the fork member 5B. In fact, considering the left-hand parts when viewing FIGS. 1 and 2 and considering also FIGS. 1A and 2A, compared to FIGS. 6A, 6B and 6C, it can be noted that the splined profile 15 may be engaged with the splined-profile cavity 5C, the two profiles being in the corresponding angular conditions—shown in FIG. 6C—which correspond to those shown in FIG. 1 and also in FIGS. 3 and 4. When a difference in angular position of the profile 15 is encountered, as shown in FIG. 7A, with respect to the condition considered in FIG. 6A, with an angular deviation which in the drawing is by way of example 20°, it is easy to perform engagement of the fork member 5B with which the splined cavity 5C is associated, because the assembly consisting of the shaft 1 and the cardan joint 5 may be displaced by 20° with respect to the assembly consisting of the shaft 3 and the fork member 7, as clearly shown when considering FIGS. 7B and 7C compared to FIGS. 6B and 6C, this resulting in the possibility of said assembly being coupled with the mechanism having a profile 15 which is out of alignment by 20°. This possibility may be extended up to a relative angular deviation varying from nearly zero up to nearly 60° When the number of splined profiles is greater than six, the maximum deviation is reduced.

On the other hand the functional capacity of the transmission, with the shafts 1 and 3 shaped according to the invention instead of with profiles which are exactly the same as each other, remains unchanged except for the initial play which it may have for the possibility of engagement between the splines of the shaft 1 and the projections of the shaft 3.

It is understood that the drawing shows only a simplification provided only by way of a practical demonstration of the invention, the forms and arrangements being able to be varied without, however, departing from the scope of the idea which underlies the invention itself. Any presence of reference numbers in the accompanying claims has the purpose of facilitating reading of the claims with reference to the description and the drawing and does not limit the scope of protection represented by the claims.

What I claim is:

1. A telescopic extendable mechanical transmission with two splined shaft axially slidable with respect to each other and in particular equipped with end cardan joints with engaging systems for coupling to adjacent mechanisms, wherein the splined profiles of the two shafts are shaped so as to provide mutual angular play, an outer splineds of said shafts is equipped with inner splines and an inner splined shaft of said shafts is equipped with outer projections, wherein the inner splines of the outer shaft have a width greater than a width of the outer projections of the inner splined shaft, in order to obtain a mutual angular play of at least 60° in which the outer shaft is tubular with a constant thickness, wherein, for an engagement in a single correct relative condition, one of the splines has a depression at the entry point and a corresponding depression is provided along one of the longitudinal projections of the inner shaft.

2. A mechanical transmission comprising:
   a first shaft with an angular play end and a fixed play end, said fixed play end being connectable to a first machine in a plurality of angular positions, said plurality of angular positions being spaced by an angular distance;
   a second shaft with an angular play end and a fixed play end, said fixed play end being connectable to a second machine, said angular play end of said second shaft being rotatably connected to said angular play end of said first shaft through a limited angular play, said limited angular play being greater than or equal to said angular distance, said limited angular play being less than one full revolution to enable said first and second shafts to transmit rotation from one said shaft to another.

3. A mechanical transmssion in accrodance with claim 2, wherein:
   said angular distance is approximately 60 degrees and said limited angular play is approxinately 60 degrees.

4. A mechanicl transmission in accordance with claims 2, wherein:
   said fixed play end of said first includes a first number of splines;
   one of said angular play ends includes a second number of splines, said second number of splines being half of first number of splines;
   another of said angular play ends defining recesses for receiving said splines of sad one angular play end, said recesses having an angular distance greater than or equal to said angular distance of said angular positions of said first shaft.

5. A mechanical transmission in accordance with claim 4, wherein:
   said first number of splines is 6;
   said second number of splines is 3;
   said angular distance of said recesses and sad angular distance of said angular positions is approximately 60 degrees.

6. A mechanical transmission in accordance with claim 2, wherein:

said angular play ends of said shafts are axially slidable with respect to each other.

7. A mechanical transmission in accordance with claim 2, wherein:

each of said first and second shafts include a cardan joint between said fixed play end and said angular play end.

8. A mechanical transmission in accordance with claim 7, wherein:

said limited angular play has one end position arranging said cardan joints angularly spaced by approximately 90 degrees.

9. A mechanical transmission in accordance with claim 2, wherein:

each of said angular positions rotationally fix said first shaft in a circumferential direction to a member of said first machine.

10. A mechanical transmission in accordance with claim 4, wherein:

said angular play ends of said shafts are axially slidable with respect to each other, each of said first and second shafts include a cardan joint between said fixed play end and said angular play end;

said limited angular play has one end position arranging said cardan joints angularly spaced by approximately 90 degrees;

each of said angular positions rotationally fix said first shaft in a circumferential direction to a member of said first machine.

11. A mechanical transmission in accordance with claim 2, wherein:

one of said angular play ends includes a plurality of splines, one of said splines including a depression;

another of said angular play ends defines a plurality of projections engaging with said spines, one of said projections includes a depression corresponding with said depression of said one spline for an engagement in a single correct relative condition of said first and second shafts.

12. A telescopic extendable mechanical transmission with two splined shafts axially slidable with respect to each other and in particular equipped with end cardan joints with engaging systems for coupling to adjacent mechanisms, wherein the splined profiles of the two shafts are shaped so as to provide mutual angular play, the outer shaft being tubular with a constant thickness, wherein, for an engagement in a single correct relative condition, one of the splines has a depression at the entry point and a corresponding depression is provided along one of the longitudinal projections of the inner shaft.

* * * * *